United States Patent [19]

Palmer

[11] 4,138,102
[45] Feb. 6, 1979

[54] AUTOMATIC DOCUMENT PROCESSING DEVICE

[75] Inventor: Allen J. Palmer, Bedford, Tex.

[73] Assignee: Xerox Corporation, Stamford, Conn.

[21] Appl. No.: 782,660

[22] Filed: Mar. 30, 1977

[51] Int. Cl.$^2$ .................. B65H 5/22; B65H 29/30; B65H 29/06
[52] U.S. Cl. .................. 271/3; 101/382 MV; 271/82; 271/193; 271/277; 271/DIG. 3; 346/132; 346/138
[58] Field of Search .................. 271/3, 7, 275, 277, 271/193, 80, 82, DIG. 3; 346/125, 132, 138; 101/382 MV; 226/8

[56] References Cited

U.S. PATENT DOCUMENTS

| | | | |
|---|---|---|---|
| 2,880,997 | 4/1959 | Brown | 271/193 UX |
| 3,581,257 | 5/1971 | Priessnetz | 346/138 UX |
| 3,788,636 | 1/1974 | Rehm | 271/275 X |
| 3,844,461 | 10/1974 | Robison | 226/8 |
| 3,906,512 | 9/1975 | Farlow | 271/277 X |
| 3,977,586 | 8/1976 | Hertrich | 226/143 X |

Primary Examiner—Richard A. Schacher

[57] ABSTRACT

The present invention provides a document handling system having a processing device for transmitting information to and from a document and a document feed unit for driving the document along a feed path to the processing device. The system includes a pair of gripper bars and an electromagnet structure for selectively attracting the gripper bars to maintain them adjacent to the processing device. The processing device is fitted with a magnetic surface, and a control system, operating in conjunction with the feed mechanism, deactivates the electromagnet structure retaining the first gripper bar as a document is fed to the processing device. The first gripper bar is attracted to the magnetic surface of the processing device thereby clamping the document to the processing device. As the document is fed onto the processing device, the control system deactivates the elecromagnet retaining the second gripper bar such that the second gripper bar is attracted to the surface of the processing device to clamp the trailing edge of the document thereto. After the processing step has been completed, the electromagnet structure is activated to magnetically withdraw the gripper bars from the processing device to free the document for ejection from the system.

19 Claims, 11 Drawing Figures

AUTOMATIC DOCUMENT PROCESSING DEVICE

BACKGROUND OF THE INVENTION

1. Field of the Invention

The present invention relates to a document processing system and more particularly to an automatic system for positively securing a document to a processing device as information is transmitted to or from the document.

2. Prior Art

In all automatic document handling systems, the document must be positively controlled and accurately positioned on the processing device for successful operation. This is particularly true in facsimile transceiver units where information is transmitted from a document to a remote unit which receives the information and prints it onto a receiving document. In these systems, the sending document is fed to a processing device to which the document is removably attached. Operation is normally initiated by the generation of a signal indicating the readiness of a transmitter to transmit a facsimile signal in accordance with the sending document to a remote receiver.

The receiving unit likewise has a processing device to which a blank document is removably secured. The receiver is placed in a ready-to-receive condition, and the processing units of the transmitting and receiving units are operated such that the information from the sending document is transmitted to the receiving document in the receiving unit. Synchronization between the transmitting and receiving units in such a facsimile system is critical and paper position must be accurately and positively set before transmission of information commences and particularly during the transmission.

In several facsimile transceiver systems, the sending and receiving documents are attached to and rotate with a drum. A scan unit traverses the sending document as it is rotated on the drum, and the information read by the scan unit is converted to electrical signals for forwarding to the receiving unit. The receiving unit decodes the signals forwarded from the transmitting unit and through the use of a printer generates on the receiving document the information transmitted from the sending document.

A prior art system for securing the send and receive documents to a processing device is disclosed in U.S. Pat. No. 3,790,159 to Hatzmann, et al., issued Feb. 5, 1974. In this prior art system, a document is fed to a processing drum with a retention member mounted thereon. The retention member includes an arm extending upwardly from the surface of the drum and positioned in the document feed path. A leaf extension is formed from the outer edge of the retention arm and lies above the document feed path when the arm is extended from the drum. As the document is fed into the unit toward the processing drum, the leading edge of the document is positioned under the leaf extension and the retention arm is retracted into the drum to pinch the leading edge of the document between the leaf extension and the drum. In this way, the document is clamped to the drum and aligned relative to the surface of the drum.

While this system has been found to operate satisfactorily, the system does not provide for securing the trailing edge or other portion of the document to the drum. Thus, as the drum and the attached document rotate, the trailing edge of the document may rise from the drum surface thereby interfering with the reading of information from or the printing of information on the document. Additionally, the contact of the free edge with the surrounding structure results in unnecessary noise as well as the emission of paper particles from the document which may clog the printing and other operating elements of the apparatus. This prior art system also requires additional mechanical linkage to operate the movement of the retention arm to grip and release the document processed by the system.

SUMMARY OF THE INVENTION

The present invention provides a system for overcoming many of the disadvantages found in the prior art and specifically provides a document handling system which positively secures and aligns a document to the processing device. In accordance with one embodiment of the invention the document handling and processing system includes a processing device for transmitting information to and from a document. Structure is provided to form a document feed path and for driving the document along the feed path to the processing device. A pair of gripper bars and an electromagnetic for selectively attracting the gripper bars to maintain them adjacent to the processing device are provided. The processing device has a magnetic surface and controls are provided to operate in conjunction with the feed mechanism to deactivate the portion of the electromagnet retaining the first gripper bar as a document is fed to the processing device. The first gripper bar is attracted to the magnetic surface of the processing device to clamp the leading edge of the document to the processing device.

As the document is fed onto the processing device, the control system deactivates the electromagnet retaining the second gripper bar such that the second gripper bar is attracted to the magnetic surface of the processing device to clamp the trailing edge of the document to the processing device. After processing has been completed, the control unit activates the electromagnet to withdraw the gripper bars from the processing device as they pass the electromagnetic thereby freeing the document from the processing device. The document is thereafter directed out of the system.

In accordance with another embodiment of the invention, the document handling and processing system further includes guide bars supported from the processing device and engaging the ends of the gripper bars extending on each side of the processing device. These guide bars maintain the desired orientation of the gripper bars relative to the processing device.

DESCRIPTION OF THE DRAWINGS

For a more complete understanding of the present invention, and for further details and advantages thereof, reference is now made to the following description taken in conjunction with the accompanying drawings, in which:

FIG. 3 is a vertical section taken along lines 3—3 of FIG. 2.

DESCRIPTION OF THE PREFERRED EMBODIMENTS

Figure 1:
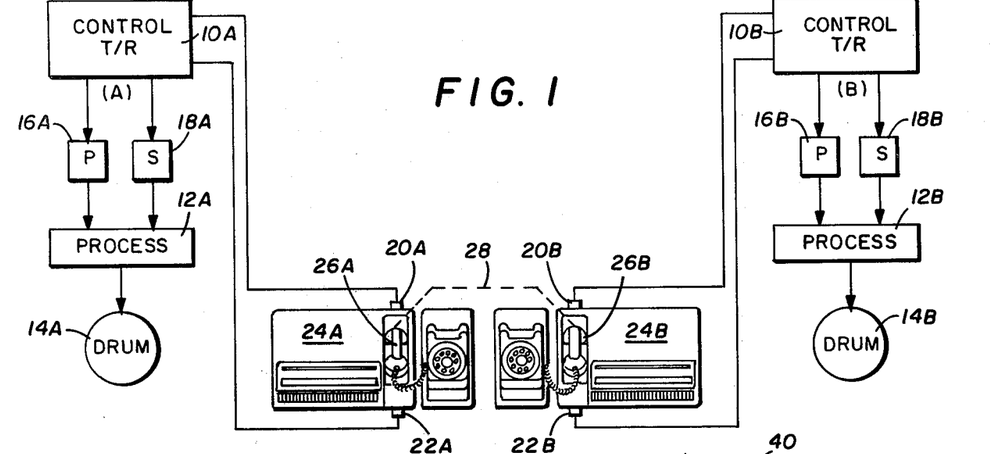
FIG. 1 is a schematic representation of a typical facsimile transmission receiving system with which the present invention finds particular utility.

FIG. 1 illustrates in a schematic representation a typical facsimile transmission receiving system with which the present invention finds particular utility. Within the generalized framework of the present invention, a suitable transceiver system is shown in FIG. 1 with a first unit located at position A and a second unit located at a remote position B. Each of the transceiver units as shown are similar one to the other and each is adapted for transmitting or receiving a signal in accordance with a desired mode of operation. Because the unit shown in positions A and B of FIG. 1 are intended to be similar for purposes of this description, like reference numerals will be used to refer to like components with the reference numeral subscriptions delineating the distinction between the units at positions A and B.

Therefore, in FIG. 1, a control unit 10 is illustrated as interacting with a processing unit 12 which coacts in turn with a processing drum 14 through print unit 16 and scan unit 18. The control unit 10 is in turn coupled to appropriate transducers 20 and 22 which form part of an acoustic coupling unit 24. The acoustic coupling unit 24 transceives appropriate signals to a data handset 26 which in turn transmits signals over a transmission line 28 to the desired remote unit.

In operation, assuming the unit at location A is transmitting and the unit at B is receiving, an appropriate control signal is entered into the control unit 10A, and through transducer 20A, handset 26A and data transmission line 28 to the receiving unit. When the receiving unit is ready to receive, it directs an appropriate signal to the transmitting unit. The processing unit 12B operates to insure that a copy sheet is in proper position on drum 14B and that a signal is ready to be received. In this ready condition, the receiving unit B is operative to receive information. Facsimile transceiver devices are described in greater detail, for example, in U.S. Pat. No. 3,432,613, to Sager, et al., issued Mar. 11, 1969, and assigned to the assignee of the present invention. It is evident from the foregoing description that automatic and positive positioning of both the sending document and copy sheet to their respective processing drums is necessary for successful transceiving of information.

Figures 2, 8:
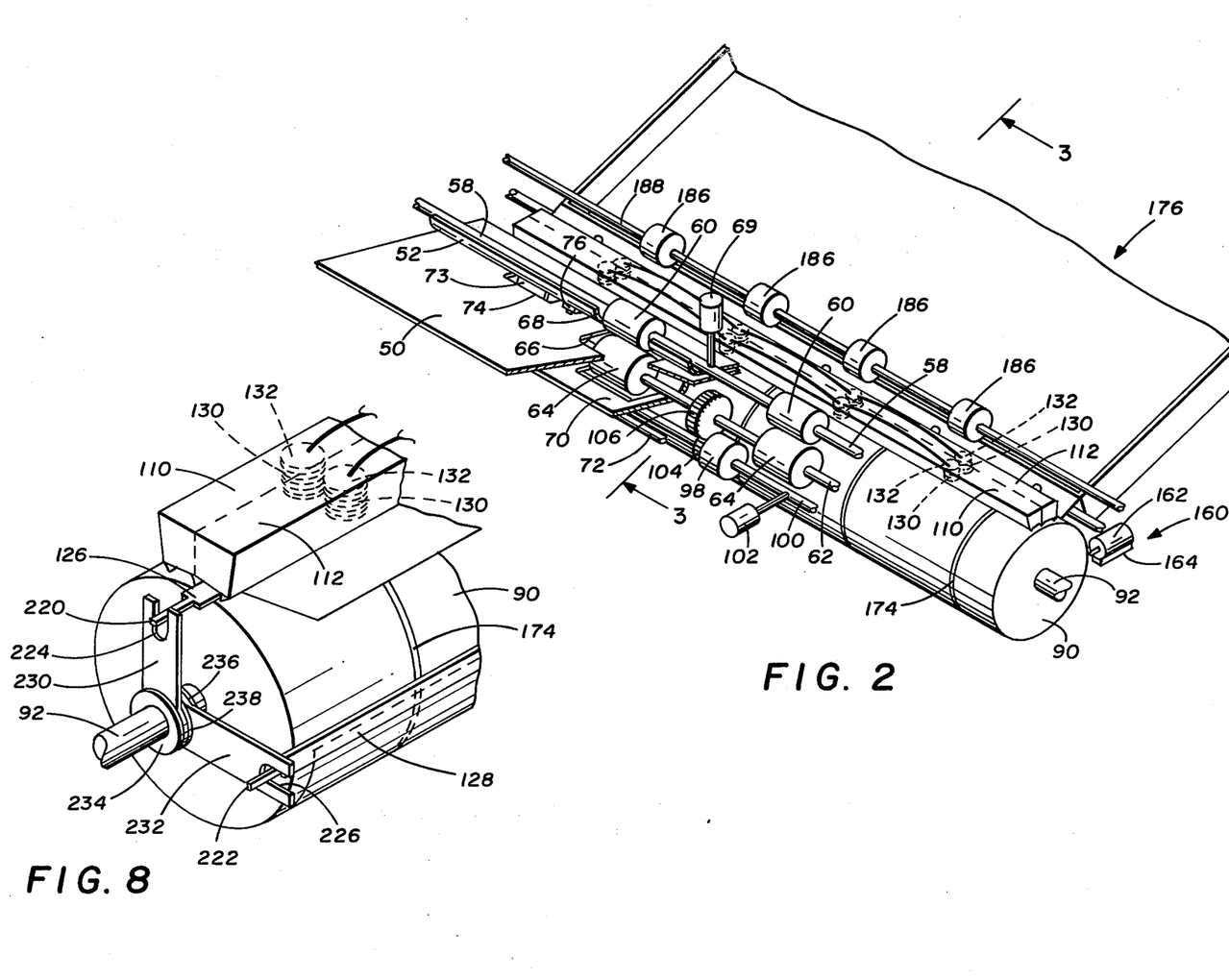
FIG. 2 is a perspective view of an automatic document handling system embodying the present invention.
FIG. 8 is a partial perspective view of an alternative embodiment of the present invention.
Figures 3, 6A, 6B, 6C, 6D:
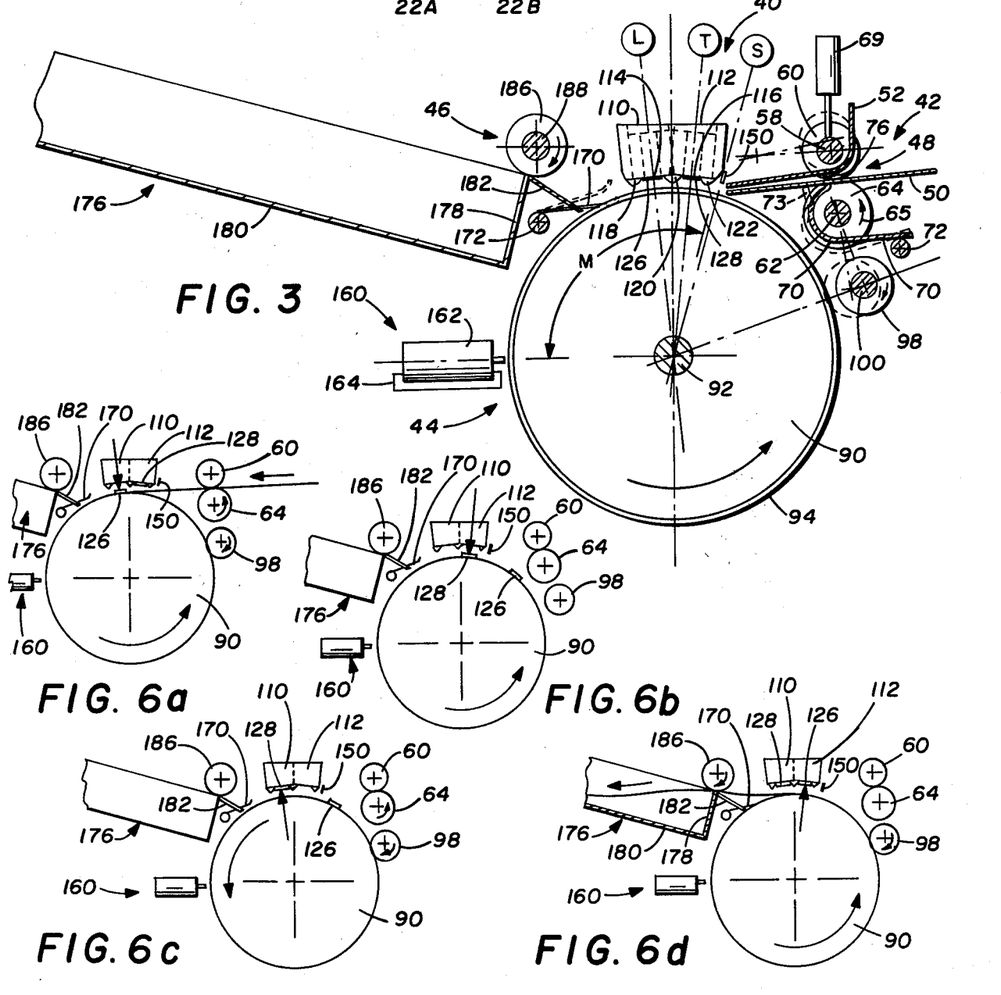

Referring now to FIGS. 2-5, and specifically to FIGS. 2 and 3, an automatic document handling system 40 embodying the present invention is provided. Document handling system 40 includes an automatic document feed unit 42, a processing unit 44 and a document eject unit 46. Document feed unit 42 includes an input chute 48 extending along the full width of system 40. Input chute 48 is formed by a lower sheet 50 and an upper sheet 52. These sheets are closely spaced one to the other to form a feed path for directing documents into the systems toward the processing unit. An idler shaft 58 is positioned above upper sheet 52 and supports a pair of document load idler rollers 60 for rotation thereon. A lower drive shaft 62 is supported below lower sheet 50 and supports a pair of drive rollers 64 spaced along drive shaft 62 and corresponding to the position of idler rollers 60. Lower and upper sheets 50 and 52 are formed with apertures 66 and 68 (FIG. 2) to permit the movement of rollers 64 and 60 therethrough. The axis of drive rollers 64 is fixed while idler shaft 58 is moveable by a solenoid 69 which acts in response to a control system. Solenoid 69 may be selectively operated to move shaft 58 toward rollers 64 to engage idler rollers 60 against drive rollers 64. As will hereinafter be discussed in greater detail, as a document is moved between rollers 60 and 64, rollers 60 are moved toward and engaged against rollers 64 in response to a control signal to pinch the document therebetween. Shaft 62 and rollers 64 are selectively rotatable in the direction of arrow 65 by a suitable motor (not shown) to document transport feed the document toward the processing unit.

A registration gate 70 is supported at its lower end from a shaft 72, and is formed with upwardly directed fingers 73 normally extending through apertures 74 in lower sheet 50. Fingers 73 of gate 70 normally block the feed path formed between lower and upper sheets 50 and 52. Paper insert sense switches 76 are positioned along the plane formed by fingers 73 such that the switches 76 are both triggered only when a document is aligned against the fingers 73. Registration gate 70 is pivoted downwardly about shaft 72 in response to actuation of the sense switches 76. Actuation of the sense switches 76 also energizes solenoid 69 to engage idler rollers 60 against drive rollers 64. Moreover, the motor (not shown) for driving drive rollers 64 is actuated when the sense switches 76 are coincidentally triggered.

The processing unit includes a drum 90 rotatable on a shaft 92. Drum 90 in a preferred embodiment of the invention has an aluminum core coated with a resilient magnitized ferrous surface 94. While this is the construction of the drum in accordance with the preferred embodiment, it will be appreciated that the drum may be constructed of other well known materials, provided an appropriate magnetic field is set up at the surface of the processing drum. As will become apparent from the following description of the operation of the invention, the complete surface of the drum need not be magnetized. Only that portion of the surface along an arc indicated by the letter M need be magnetized with the length of arc M being governed by the range of document sizes to be used in the system. A magnetized insert may therefore be substituted for the preferred structure wherein the entire surface of the drum is coated with a magnetized ferrous material.

A drum drive roller 98 is positioned adjacent drum 90 on a shaft 100. Shaft 100 is supported by an appropriate linkage to permit the inward translation under the action of a solenoid 102. By the actuation of solenoid 102, shaft 100 is moved inwardly to engage roller 98 against the surface of drum 90. A gear 104 is attached adjacent roller 98 on shaft 100 and meshes with a gear 106 attached for rotation with drive shaft 62. Therefore, the rotation of shaft 62 accomplished both the rotation of rollers 64 and drive roller 98.

A forward electromagnetic unit 110 and a rear electromagnetic unit 112 are supported adjacent the surface of drum 90 with their longitudinal axes parallel to the rotational axis of drum 90. Referring to FIG. 3, electromagnetic units 110 and 112 have channels 114 and 116, respectively, formed therein intermediate of rib protrusions 118, 120 and 122 extending downwardly from units 110 and 112.

Figure 4:
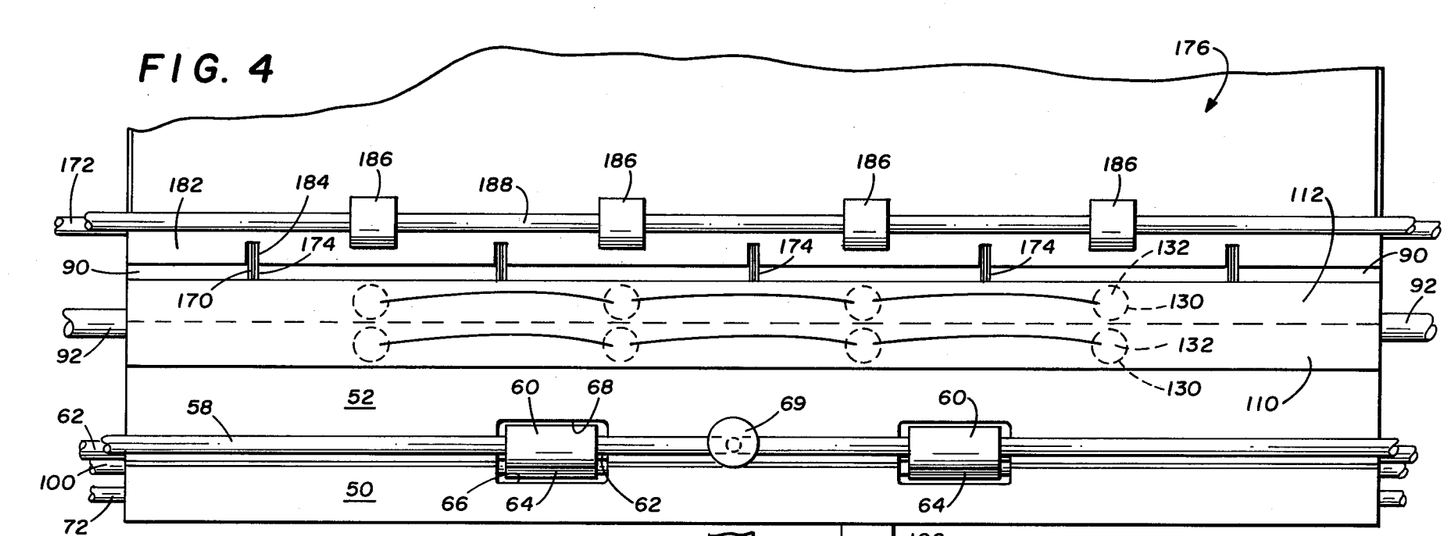
FIG. 4 is a top plan view of the system illustrated in FIG. 2.
Figure 5:
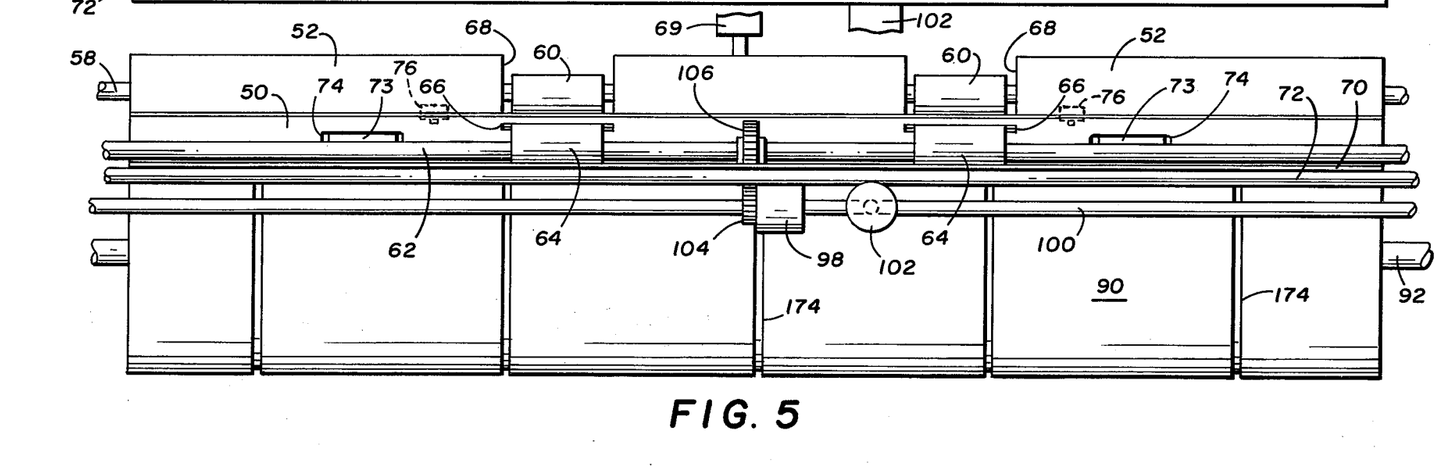
FIG. 5 is a front elevation of the system illustrated in FIG. 2, FIGS. 6a–d are schematic representations showing various stages of operation of the present invention.

Referring to FIG. 3, the center line of channel 114 is positioned at station L while the center line of channel 116 is positioned at station T. Channels 114 and 116 are dimensioned to receive a leading edge gripper bar 126 and a trailing edge gripper bars and their respective channels coincide. Gripper bars 126 and 128 are relatively thin, long ferrous metal straps. As is best seen in FIGS. 2 and 4, electromagnet units 110 and 112 have a plurality of apertures 130 formed therein which receive coil windings 132. Windings 132 are wired in series and are connected to a suitable power source (not shown). It will therefore be appreciated that by energizing the power source, a magnetic field may be selectively set up around electromagnetic units 110 and 112.

A sensor 150 is positioned immediate in front of electromagnet unit 112 at station S. The sensor may be of any suitable type capable of detecting the passage of the leading or trailing edge of a document on the processing drum and also capable of detecting the passage of the leading or trailing edge gripper bars therebelow. In a preferred embodiment of the invention, sensor 150 includes a light emitting diode cooperating with a photosensor to distinguish the passage of either the leading or trailing edge of a document or the gripper bars therebelow by reflecting a beam of light emitted from the light emitting diode from the drum surface onto the photosensor. In this embodiment, the surface of the processing drum is highly polished such that the photosensor normally receives the reflection of the light. In this way, the sensor can detect the passage of the document of gripper bars therebelow by the interruption of the reflected light. As will be hereinafter discussed in greater detail, sensor 150 is connected to a controller (not shown) which operates in response to the sensing of a document by sensor 150 to control other elements in the system.

A scan head 160 is positioned adjacent processing drum 90. Head 160 normally includes an optical sensor and an image printer 162 located on a carriage 164. In the processing operation, carriage 164 traverses along a path parallel to the rotational axis of drum 90, and the scan head operates in accordance with the mode of operation of the transceiver unit to either read information from or print information on the document carried by the processing drum.

The eject unit 46 includes a plurality of wire bails 170 supported for rotation on a shaft 172. Bails 170 are movable from an up position (shown on phantom in FIG. 3) to an eject position in which the bails are lowered into annular receiving grooves 174 (FIG. 2) formed in a surface of processing drum 90.

A collection tray 176 is supported adjacent processing drum 90 and has an upwardly extending wall 178 joined to a back 180. A bridge platform 182 is positioned with one edge extending below wire bails 170 when in their lowered positions and with its upper edge adjacent the upper edge of wall 178 of collection tray 176. Platform 182 has a plurality of slots 184 formed therein corresponding to the position of bails 170. These slots permit the movement of bails 170 without interference with platform 182. A plurality of kicker rollers 186 are supported for selective rotation on a shaft 188. Kicker rollers 186 are preferably of a foam rubber composition such that the outer circumference of the rollers may deformably engage the upper edge of wall 178 of collection tray 176. In this way, as a document is guided from drum 90 by wire bails 170 onto bridge platform 182, the leading edge of the document is pinched between the upper edge of wall 178 and the circumference of rollers 186 thereby driving the document into collection tray 176.

OPERATION OF THE SYSTEM

Figure 7:
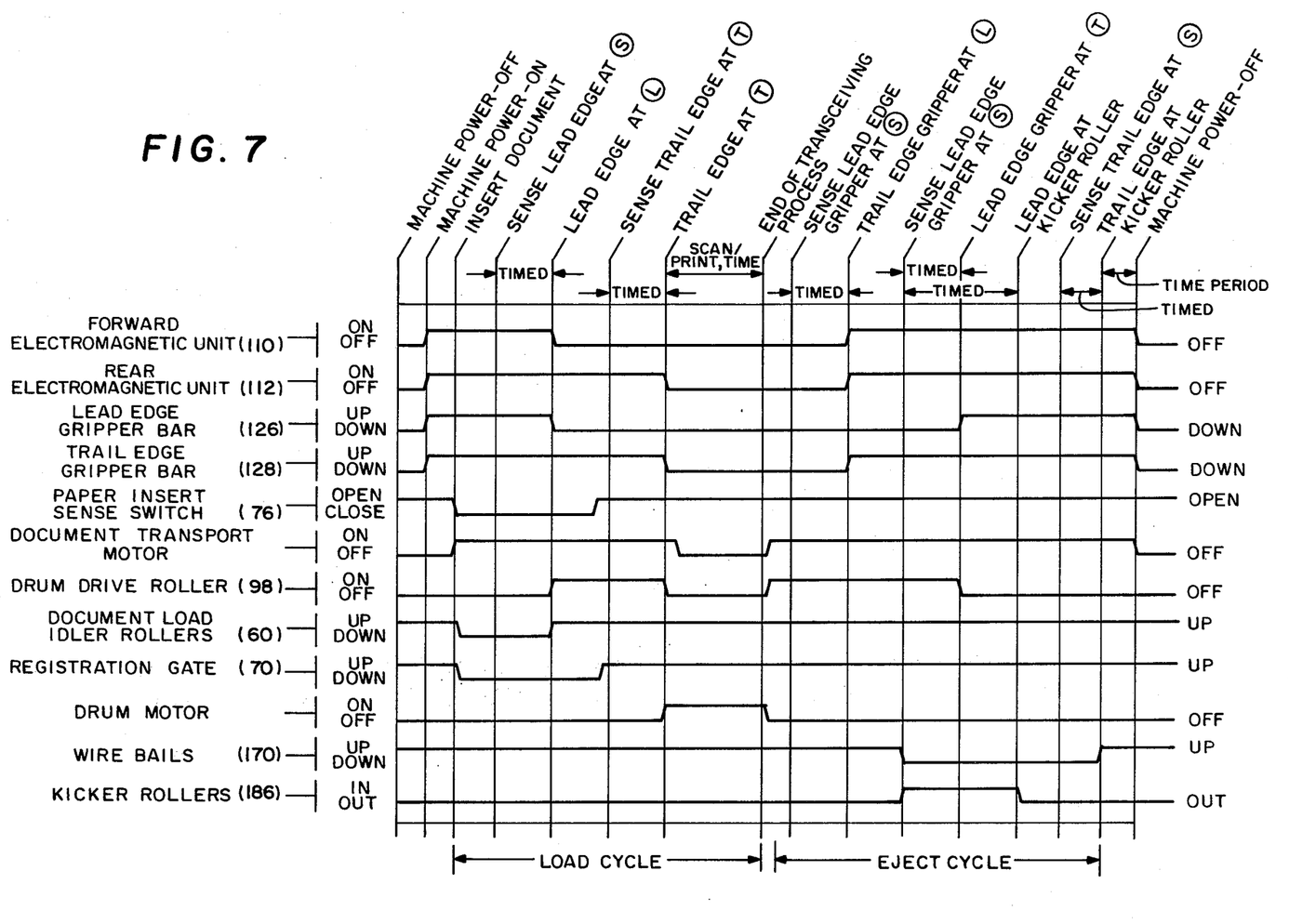
FIG. 7 is a diagram showing the timing sequence of operations of the present invention.

The operation of the present invention can best be described by referring first to FIGS. 3, 6a-d and 7. FIGS. 6a-d are schematic illustrations showing the stages of operation of the present invention wherein a document is fed into the automatic document feed unit 42, is attached to processing drum 90 and ejected into collection tray 176 after the transceiving operation. FIG. 7 diagrams the time sequence of operations necessary to accomplish the various stages of operation illustrated in FIG. 6.

In the operation of the unit, a machine on switch is engaged to supply power to the coil windings 132 in both the forward and rear electromagnetic units. As a result, a magnetic field is generated about electromagnetic units 110 and 112 having a magnetic force flux greater than the magnetic attraction of the magnetic surface of drum 90. Metal gripper bars 126 and 128 are drawn by magnetic attraction into a nested position in channels 114 and 116 formed in electromagnetic units 110 and 112, respectively. These bars are guided into channels 114 and 116 by the protrusions 118, 120 and 122 forming channels 114 and 116.

At this point, a document D having information to be transmitted to a remote transceiver or which is to receive information transmitted from a remote transceiver is inserted into the automatic document feed unit 42. Insertion is made between lower and upper sheets 50 and 52 such that the leading edge of the document is engaged against fingers 73 of registration gate 70 which block the feed path formed by sheets 50 and 52. Coincident actuation of the sense switches 76 causes the downward rotation of registration gate 70, the movement of rollers 60 downwardly into engagement with rollers 64, and the actuation of a drive motor coupled to drive rollers 64 to rotate the rollers in the direction of arrow 65. It will be appreciated that at this stage of the operation, document D is pinched between rollers 60 and 64 thereby driving the document along the feed path toward processing drum 90.

Referring to FIGS. 6a-d, document D is fed toward processing drum 90. As the document leading edge passes sensor 150, a time sequence is initiated by a controller (not shown) which causes the deactivation of forward electromagnet unit 110 as the leading edge of document D passes below the center line of leading edge gripper bar 126. Upon deactivation of electromagnet unit 110, gripper bar 126 is attracted toward the magnet surface of processing drum 90 thereby clamping the leading edge of the document to the processing drum (FIG. 6a).

The controller simultaneously deactivates solenoid 69 permitting idler rollers 60 to move upwardly from drive rollers 64 while activating solenoid 102 forcing drum drive roller 98 against the processing drum 90 to begin the counterclockwise rotation of the processing drum as viewed in FIG. 3. This is done with the deactivation of electromagnet unit 110 and the clamping of the leading edge of document D onto drum 90. Wire bails 170 are maintained in their up position as illustrated in FIG. 6a, and document D is carried forward with the rotation of drum 90. As the trailing edge of the document is sensed by sensors 150, a signal is deployed to the controller which raises registration gate 70 and begins a timer for control of the deactivation of rear electromagnet unit 112. Continuing the timed sequence, the controller deactivates unit 112 as the trailing edge of document D passes below the center line of trailing edge gripper bar 128. As electromagnet unit 112 is deactivated, gripper bar 128 is attracted to the magnetic surface of drum 90 thereby clamping the trailing edge of document D to the processing drum. Simultaneously therewith, solenoid 102 controlling the document transport motor is deactivated and roller 98 is automatically rotated away from drum 90 (FIG. 6b).

A drum motor (not shown) is connected to drive shaft 92 to rotate processing drum 90 during the transceiving phase. As drum 90 is rotated during this phase of the process, scan head 160, including the optical sensor and image printer 162, is carried in a direction parallel to the longitudinal axis of drum 90. The scan and print devices operate in accordance with the mode of operation of the transceiver unit. In typical usage, the scan relies on optical generation and reflection and the printing upon a selectively actuated marking tip. Examples of the operation of scanning and marking devices employed in conjunction with facsimile transmission are found in the aforementioned U.S. Pat. No. 3,432,613, to Sager, et al., as well as in U.S. Pat. No. 3,598,910, to Johnson, also assigned to the assignee of the present invention.

During processing, carriage 164 traverses the length of the drum, scanning the document D in a helical pattern based upon a desired number of lines per inch. A typical scan time can occupy, but is not limited to, four to six minutes, depending upon the resolution and the transmission capability of the facsimile system. Again, at the end of this timed sequence, the drum motor is deactivated, the drum drive roller 98 is engaged against drum 90, and the motor driving roller 98 is activated.

As the leading edge of document D is sensed below sensor 150 a timing sequence is initiated to accomplish the following sequence. Both electromagnet units 110 and 112 are energized to create a magnetic field as the leading edge gripper bar 126 passes below the center line of electromagnet unit 110. As a result, gripper bar 126 is attracted to electromagnet unit 110 into channel 114 and away from drum 90 (FIG. 6c). It will be appreciated that the trailing edge gripper bar 128 is subsequently attracted into the rear electromagnet unit 112.

A document removal sequence is initiated when the leading edge of document D and gripper bar 126 again pass below sensor 150. At that time, the controller rotates shaft 172 to lower wire bails 170 into annular grooves 174 formed in drum 90. As the leading edge gripper bar passes below electromagnet unit 110, the gripper bar is withdrawn from drum 90 into channel 114 of electromagnet unit 110. The rotation of drum 90 and the engagement of document D between drive roller 98 and drum 90 feeds document D over bails 170 and above bridge platform 182. The controller activates the drive mechanism for rotating shaft 188 of kicker rollers 186 such that document D is engaged between the foam rubber outer surface of kicker roller 186 and the upper edge of wall 178 of collection tray 176 (FIG. 6d). In accordance with the timed sequence, after engagement of the leading edge of document D between kicker roller 186 and the upper edge of wall 178, drive roller 98 is disengaged from drum 90 and document D is drawn through the eject unit and projected into collection tray 176. After a sufficient time required to feed the document past kicker rollers 186, the unit is reset to repeat the sequence.

Alternatively, the document removal sequence may be as follows. The leading edge of document D passes below sensor 150 to being a timed sequence. As the leading edge of document D and the leading edge gripper bar 126 passes below electromagnet units 110 and 112, these units are energized developing an electromagnet field therearound to withdraw leading edge gripper bar 126 from drum 90. The controller rotates shaft 172 to lower wire bails 170 into grooves 174 formed in drum 90. As drum 90 continues to rotate, bails 170 direct the leading edge of document D above bridge platform 182 and against kicker roller 186. The timing sequence actuates kicker roller 186 to rotate thereby engaging document D between the foam outer surface of roller 186 and the upper lip of wall 178 of collection tray 176. Drum 90 continues to be rotated, and as the trailing edge of document D and the trailing edge gripper bar 128 passes below electromagnet unit 112, the magnetic force of unit 112 draws gripper bar 128 into channel 116. Kicker roller 186 continues to rotate until the document is completely fed from the eject unit into collection tray 176.

FIG. 8 illustrates an alternative embodiment wherein gripper bars 126 and 128 are adapted with tabs 220 and 222 extending from the ends thereof. Tabs 220 and 222 are received in slots 224 and 226 formed in alignment arms 230 and 232, respectively. As is shown in FIG. 8, arms 230 and 232 are received on shaft 92 and retained thereon by retaining rings 234 and 236 and spaced one from the other by a spacer 238. Slots 224 and 226 of arms 230 and 232 permit gripper bars 126 and 128 to move radially relative to processing drum 90. Thus, while the gripper bars may move radially relative to arms 230 and 232, all circumferential movement of the gripper bars is guided by arms 230 and 232 which are free to rotate on shaft 92. In this way, guidance is provided to the gripper bars to maintain accurate alignment of the bars relative to the processing drum.

Therefore, the present invention provides a document handling system which positively secures and aligns a document to the processing device. The document handling system includes a processing device for transmitting information to and from a document. A document feed unit is provided for driving the document along a feed path to the processing device. The system includes a pair of gripper bars and an electromagnet structure for selectively attracting the gripper bars to maintain them adjacent to the processing device. The processing device is fitted with a magnetic surface, and a control system operating in conjunction with the feed mechanism, deactivates the electromagnet structure retaining the first gripper bar as a document is fed to the processing device. The first gripper bar is attracted to the magnetic surface of the processing device to clamp the leading edge of the document to the processing device. As the document is fed onto the processing device, the control system deactivates the electromagnet retaining the second gripper bar such that the second gripper bar is attracted to the surface of the processing device to clamp the trailing edge of the document thereto. After the processing step has been completed, the electromagnet structure is reactivated to withdraw the gripper bars from the processing device to free the document therefrom. The document is subsequently directed out of the unit and the system is reset to ready it for a second transceiving cycle.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the appended claims.

What is claimed is:

1. An automatic document handling and processing system having a processing device for processing a document and a unit for feeding the document to the processing device and for removing the document from the processing device after processing, comprising:
   a gripper bar,
   first magnetic means selectively activated to retain said gripper bar in a position removed from the processing device,
   second magnetic means on the processing device for attracting said gripper bar to a document retaining position on the processing device, and
   sensor means operable in response to the presence of a document in the system for deactivating said first magnetic means such that said gripper bar is attracted to said second magnetic means on the processing device to clamp said document to said processing device,
   said sensor means being positioned remote from said first magnetic means upstream of the feedpath of the document such that the deactivation of said first magnetic means corresponds to the passage of the leading edge of the document between said first magnetic means and the processing device.

2. The system of claim 1 wherein said first magnetic means includes an electromagnet selectively operable to release said gripper bar for attraction by said second magnetic means to a document retaining position on the processing device and for selectively attracting said gripper bar from the processing device to free the document therefrom.

3. The system of claim 1 further comprising:
   sensor means operable in response to the completion of processing for activating said first magnetic means to withdraw said gripper bar from the processing device to free the document therefrom.

4. The system of claim 1 further comprising:
   third magnetic means positioned adjacent the processing device,
   a second gripper bar selectively retained by said third magnetic means in a position removed from the processing device by activation of said third magnetic means, and
   sensor means operable in response to the movement of a document therepassed for deactivating said third magnetic means such that said second gripper bar is released from said third magnetic means to a document retaining position on the processing device.

5. The system of claim 4 wherein said sensor means is positioned remote from said third magnetic means upstream of the feed path of the document such that the deactivation of said third magnetic means corresponds to the passage of the trailing edge of the document between said third magnetic means and the processing device.

6. The system of claim 4 further comprising:
   first guide means for supporting the ends of said gripper bar to guide the movement of said gripper bar from said first magnetic means to contact with said second magnetic means on the processing device, and
   second guide means for supporting the ends of said second gripper bar to guide the movement of said second gripper bar from said third magnetic means to contact with said second magnetic means on the processing device.

7. The system of claim 4 wherein said third magnetic means includes an electromagnet selectively operable to release said second gripper bar for attraction by said second magnetic means to a document retaining position on the processing device.

8. The system of claim 1 further comprising:
   guide means for supporting the ends of said gripper bar to guide the movement of said gripper bar from said first magnetic means to contact with said second magnetic means on the processing device.

9. An automatic document feeding, processing and handling system having a processing device for transmitting information to and from a document, a document feed unit for feeding a document to said processing device, and a document eject unit for removing the document after processing, comprising:
   a gripper bar positioned adjacent the processing device,
   magnetic means mounted on the processing device for attracting said gripper bar toward the processing device to clamp the document to the processing device, and
   means responsive to completion of processing for withdrawing said gripper bar from the processing device to free the document therefrom,
   said processing device including a drum to which the document is clamped by said gripper bar and a scanner for reading information from and printing information on the document, and
   said magnetic means including a magnetic surface on said drum.

10. The system of claim 9 wherein said means for withdrawing said gripper bar from the processing device includes an electromagnet selectively operable to magnetically attract said gripper bar from the processing device.

11. The system of claim 9 further comprising:
   a second gripper bar positioned adjacent the processing device, said second gripper bar being attracted by said magnetic means on the processing device to clamp the document to the processing device, and
   means responsive to completion of processing for withdrawing said second gripper bar from said processing device to free the document therefrom.

12. The system of claim 11 wherein said means for withdrawing said second gripper bar includes a second electromagnet selectively operable to magnetically attract said second gripper bar from the processing device.

13. The system of claim 9 further comprising:
   guide means for supporting the ends of said gripper bar to guide the movement of said gripper bar from said magnetic means to contact with the processing device.

14. The system of claim 9 further comprising:
   guide means extending from each side of said drum for supporting the ends of said gripper bar to guide the movement of said gripper bar from said magnetic surface on said drum during withdrawal of said gripper bar by said withdrawing means.

15. The system of claim 14 further comprising:
a second gripper bar positioned adjacent said drum, said second gripper bar being attracted by said magnetic surface on said drum to clamp the document to said drum,
means responsive to completion of processing for withdrawing said second gripper bar from said drum to free the document therefrom, and
second guide means extending from each side of said drum for supporting the ends of said second gripper bar to guide the movement of said second gripper bar from said magnetic surface on said drum during withdrawal by said withdrawing means.

16. In an automatic document processing unit having a processing device for processing a document and means for feeding a document to said processing device, a system for selectively securing the document to the processing device, comprising:
a gripper bar,
means for supporting said gripper bar adjacent said processing device,
magnetic means on said processing device for attracting said gripper bar toward said processing device,
means for selectively retaining said gripper bar spaced apart from said processing device,
sensor means for controlling said retaining means to selectively release said gripper bar as the document is fed between said gripper bar and said processing device such that the document is clamped between said gripper bar and said processing device,
a second gripper bar,
means for positioning said second gripper bar adjacent said processing device,
additional magnetic means on said processing device for attracting said second gripper bar toward said processing device to clamp the document to said processing device,
means for selectively retaining said second gripper bar spaced apart from said processing device, and
another sensor means for releasing said second retaining means as the trailing edge of the document is fed between said second gripper bar and said processing device whereby said second gripper bar is attracted to the additional magnetic means on said processing device to clamp said document to said processing device.

17. The system of claim 16 wherein said means for retaining said gripper bar includes an electromagnet selectively operable to retain said gripper bar spaced apart from said processing device.

18. The system of claim 17 wherein said electromagnet is deactivated as the document is fed onto said processing device such that said gripper bar is attracted to the magnetic means on said processing device to clamp the leading edge of the document therebetween.

19. The system of claim 11 wherein said means for retaining said second gripper bar includes an electromagnet selectively operable to retain said gripper bar from said processing device.

* * * * *